Nov. 4, 1969

P. L. CRELLIN 3,476,953

AUTOMATIC SWITCHING CONTROL CIRCUIT

Filed April 22, 1968

*INVENTOR.*
PETER L. CRELLIN

*BY*

Cyril O. Kunzer

ATTORNEY 3,476,953
AUTOMATIC SWITCHING CONTROL CIRCUIT
Peter Lewis Crellin, Clearwater, Fla., assignor to Sylvania Electric Products Inc., a corporation of Delaware
Filed Apr. 22, 1968, Ser. No. 722,993
Int. Cl. H01h 9/54
U.S. Cl. 307—125 6 Claims

ABSTRACT OF THE DISCLOSURE

An automatic switching control circuit including a delay inducing capacitor operative in response to a recorded control signal to energize a relay to initiate activation of a slide changer mechanism. The trigger circuit includes a class B amplifier having its output coupled in series with the relay coil. The delay inducing capacitor shunts the relay coil, thereby preventing energizing of the relay and activation of the slider changer mechanism upon the occurrenc of transient signals.

Background of the invention

This invention relates generally to switching circuitry and more particularly to improved automatic switching control circuitry operative in response to a signal of given frequency and predetermined duration to initiate a switching function.

The utility of a slide projector may be enhanced by adding a tape recorder to provide sound accompanying the picture being displayed. To provide a fully automatic system a control signal may be prerecorded on the tape, which control signal, when detected, is operative to initiate automatic changing of the slide. With such a system, a complete audio/visual presentation can be prerecorded or preprogramed, and the playback can be completely automatic. One difficulty with this type of system is due to the limited bandwidth of the tape recorder, which requires that the control signal used must be in the audio range if it is to be faithfully reproduced by the tape system. This means that normal audio signals at the control signal frequency or transient signals may erroneously initiate the automatic slide changer, thereby resulting in a discontinuity between the audio and visual presentations. In an attempt to overcome this problem, relatively elaborate, narrow bandwidth filters may be used. However, these filters adversely affect the economy of the system and additionally are still responsive to spurious signals at or near the control signal frequency.

Objects and summary of the invention

Accordingly, it is a principal object of the invention to provide improved automatic switching control circuitry which overcomes the disadvantages of the prior art circuitry.

Another object of the invention is to provide improved automatic switching control circuitry which is reliable in operation and economical in design.

According to one aspect of the invention, a suitable signal is applied to the control electrode of a class B amplifier, the output of which is connected in series with the control winding of a switching relay. The output of the amplifier includes a delay inducing capacitor which delays energization of the relay for a predetermined period to thereby prevent energization of the relay by short duration transient noise signals.

Description of the preferred embodiments

For a better understanding of the present invention, together with other and further objects, advantages and capabilities thereof, reference is made to the following disclosure and appended claims in connection with the above described drawings. For ease of understanding the invention will be illustrated in the context of a tape recorder/slide projector system wherein the slide projector has an automatic slide changing capability, although it will be readily apparent that the invention has broader utility in accordance with the full scope of the claims.

Figure 1:
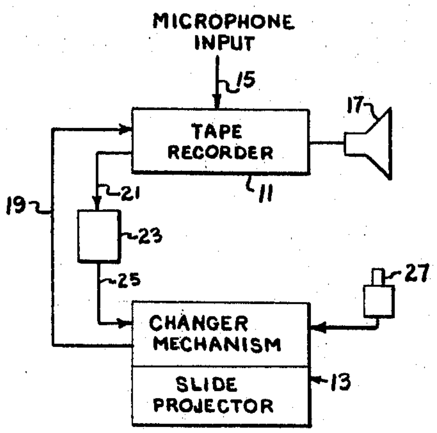
FIG. 1 is a block diagram of a tape recorder/slide projector system in which the invention finds utility.

Referring first to FIG. 1, there is shown a tape recorder/slide projector system including a tape recorder 11 and a slide projector with a changer mechanism 13. The tape recorder has a microphone input 15 and a speaker output 17. In addition, the recorder receives an input 19 from the slide system and has an output 21 coupled to an automatic switching control circuit 23. The output 25 of the automatic control circuit is coupled to the changer mechanism of the slide system. The slide system also includes a manual push-button 27 operative to activate the changer mechanism.

The above described system has the capability of automatically providing a recorded audio presentation accompanied by a synchronized visual slide display. During the recording operation, the desired audio information in connection with a slide is recorded on the tape via the microphone input 15. When the slide is changed, for example, by pressing the push-button 27 which activates the changer mechanism to advance to the next slide, it also causes a control signal output on line 19 to be recorded on the tape. Then, the audio information connected with the new slide is recorded on the tape, and, when complete, the next slide is advanced, again impressing a recorded control signal on the tape. This sequence is continued until the complete audio/visual program is recorded.

The playback of the audio/visual program is then completely automatic once the system is activated. Upon completion of the audio description of the first slide, the recorded control signal is coupled from the output 21 of the recorder 11 to the automatic switching control circuit 23 which provides an output 25 in response thereto to the changer mechanism of the slide system 13 operative to activate the changer mechanism to present the next slide. Then the audio presentation accompanying the new slide is begun and at the end thereof, the next recorded control signal recorded on the tape is coupled to the automatic switching control circuit 23 to again activate the changer mechanism, and so on until the entire program is completed.

Figures 2, 3A, 3B:
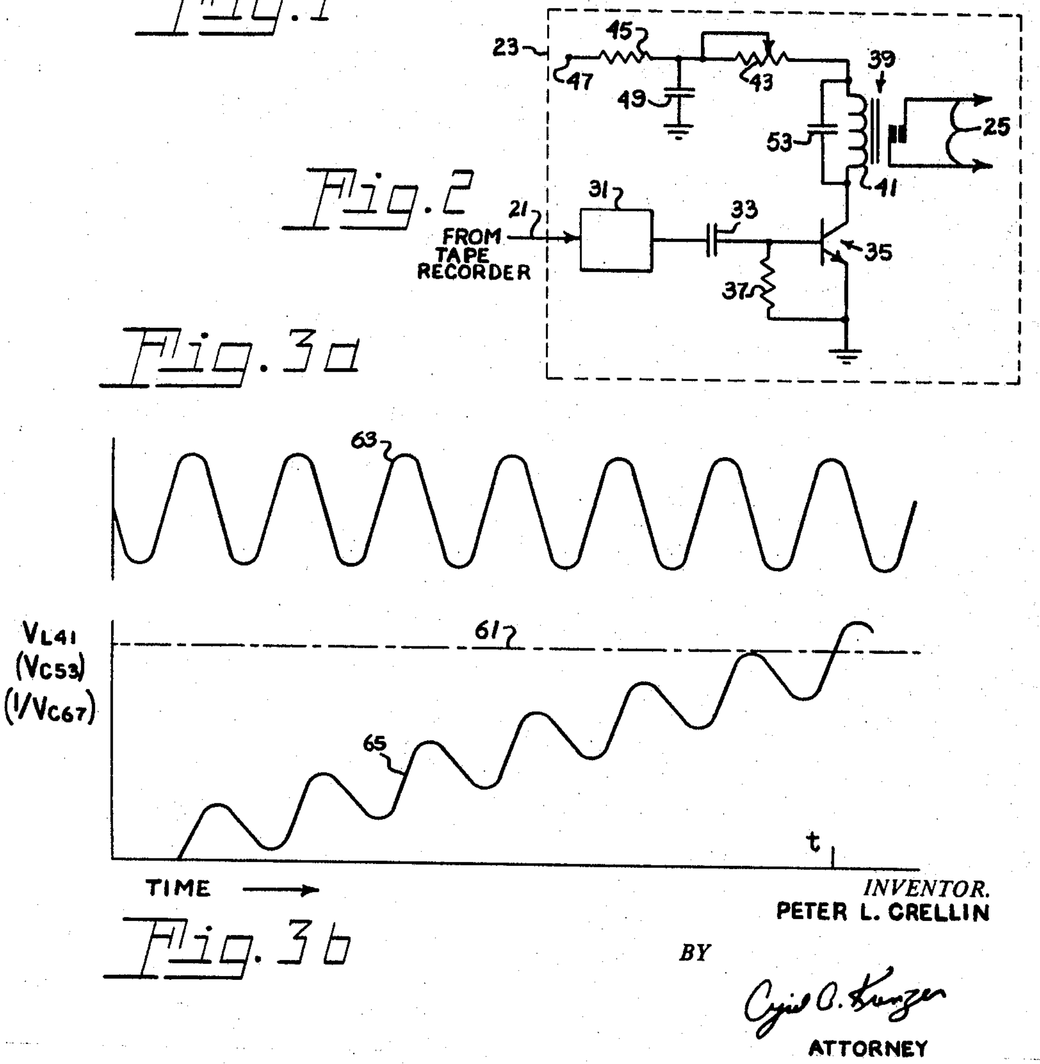
FIG. 2 is a schematic circuit diagram of one embodiment of an automatic switching control circuit according to the present invention.
FIGS. 3A and 3B are representations of signal waveforms useful in understanding the operation of the invention.

Referring next to FIG. 2, one embodiment of the automatic switching control circuit 23 includes a conventional filter 31 adapted to receive the input 21 from the tape recorder. The output of the filter is coupled via a capacitor 33 to the base electrode of a transistor 35, the emitter electrode of which is connected to ground. A resistor 37 is connected between the base electrode of the transistor 35 and ground. A switching relay 39 has a control winding 41, one end of which is coupled to the collector electrode of the transistor. The other end of the control winding 41 is connected in series with a sensitivity control potentiometer 43 and a resistor 45 to a source of energizing potential as represented by the terminal 47. A capacitor 49 is connected between the junction of the resistor 45 with the potentiometer 43 and ground. The relay contacts 51 are coupled to the output 25 going to the changer mechanism of the slide system 13. A delay capacitor 53 is connected in parallel with the control winding 41 of the relay 39.

The operation of the circuit of FIG. 2 is more easily understood by considering it in conjunction with the signal waveforms of FIGS. 3A and B. FIG. 3A represents the alternating current control signal from the tape recorder 11, passed through the filter 31 and applied to the base electrode of the transistor 35. FIG. 3B represents the voltage developed as a function of time across the capacitor 53, and hence the relay coil 41, in response to the alternating current control signals applied to the base of the transistor 35. The dot-dash line 61 of FIG. 3B represents the nominal voltage which must appear across the relay coil 41 to close the relay contacts 51. Since the transistor 35 is biased class B, in the quiescent state the transistor is non-conducting and there is no voltage drop across the relay coil 41 and zero net charge on the capacitor 53. The first positive half-cycle of the control signal drives the transistor 35 into conduction and begins to charge capacitor 53. However, the capacitor does not become fully charged during the first positive half-cycle and during the negative half-cycles, the capacitor discharges through sensitivity control 43 and resistor 45, but the discharge time constant is longer than the charging time constant and the capacitor does not fully discharge when the transistor 35 is cut off. Therefore, during each complete cycle of the control signal, the net charge on the capacitor 53, and hence the voltage across the coil 41, increases as indicated by the line 65 of FIG. 3B until sufficient charge is developed to exceed the relay threshold voltage 61, causing closure of the relay contacts 51 and thereby initiating the changer mechanism. This occurs at the time (*t*), indicated in FIG. 3B. This, of course, provides an effective delay of duration (*t*), before the automatic change mechanism is activated and thereby prevents extraneous signals having a duration of less than (*t*) from erroneously activating the mechanism.

Figure 4:
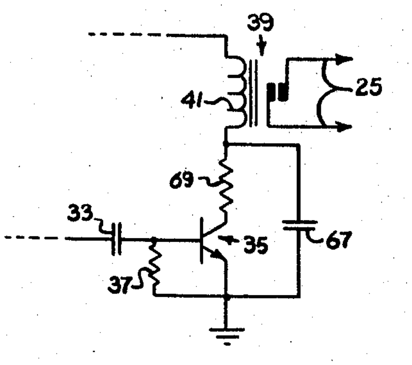
FIG. 4 is a partial schematic circuit diagram of an alternate embodiment of an automatic switching control circuit according to the present invention.

The circuit of FIG. 4 differs from the circuit of FIG. 2, in that a capacitor 67 is connected from the bottom of the relay coil 41 to ground and a resistor 69 is connected in series between the collector electrode of the transistor 35 and the relay coil. In this circuit the capacitor 67 is fully charged initially, and discharges when the transistor 35 goes into conduction. However, the net effect is the same as that of the circuit of FIG. 2, that is, to gradually build up the voltage across the relay coil on successive positive half-cycles of the control signal until the relay threshold voltage is attained. This, similarly, prevents short duration extraneous signals from erroneously activating the changer mechanism.

From the foregoing, it is apparent that applicant has provided relatively simple and economical, yet reliable, automatic switching control circuitry which prevents extraneous signals from erroneously activating the switch.

While there have been shown and described what are at present considered the preferred embodiments of the invention, it will be obvious to those skilled in the art that various changes and modification may be made therein without departing from the scope of the invention as defined by the appended claims.

I claim:

1. In a system wherein a source of predetermined alternating current signals is utilized to automatically activate a changer mechanism, an automatic switching control circuit comprising:

a source of energizing potential;

an amplifier having control and output electrodes, including means coupling the control electrode thereof to the source of alternating current signals;

switching means coupled between the output electrode of said amplifier and said source of energizing potential, operative to activate the changer mechanism in response to the alternating current signals applied to the control electrode of said amplifier; and delay means comprising a capacitor connected between the output electrode of said amplifier and a point of reference potential, operative to inhibit energization of said switching means for a predetermined time period, thereby preventing erroneous activation of the changer mechanism.

2. In a system wherein a source of predetermined alternating current signals is utilized to automatically activate a changer mechanism, an automatic switching control circuit comprising:

a transistor having emitter, base and collector electrodes;

a source of energizing potential;

means coupling the base electrode of said transistor to the source of alternating current signals;

switching means coupled between the collector electrode of said transistor and said source of energizing potential, operative to activate the changer mechanism in response to the alternating current signals applied to the base electrode of said transistor;

biasing means coupled to the base electrode of said transistor operative to effect class B operation thereof; and delay means coupled to the collector electrode of said transistor, operative to inhibit energization of said switching means for a predetermined time period, thereby preventing erroneous activation of the changer mechanism.

3. The invention according to claim 2 wherein said switching means comprises a relay having a control winding and a pair of contacts, said control winding being connected between the collector electrode of said transistor and said source of energizing potential.

4. The invention according to claim 3 wherein said delay means comprises a capacitor connected between the collector electrode of said transistor and a point of reference potential.

5. The invention according to claim 3 wherein said delay means comprises a capacitor connected in parallel with the control winding of said relay.

6. The invention according to claim 3 additionally comprising a vairable resistor connected in series between the control winding of said relay and said source of energizing potential.

References Cited

UNITED STATES PATENTS

| | | | |
|---|---|---|---|
| 3,082,357 | 3/1963 | Braverman | 317—141 |
| 3,245,156 | 4/1966 | Bloois et al. | 40—28.3 X |
| 3,289,016 | 11/1966 | Bloom et al. | 307—116 |

ROBERT S. MACON, Primary Examiner

T. B. JOIKE, Assistant Examiner

U.S. Cl. X.R.

40—28.3